:unselectable start:# US 9,253,357 B2:unselectable end:

(12) United States Patent
Mori

(10) Patent No.: US 9,253,357 B2
(45) Date of Patent: Feb. 2, 2016

(54) OPERATION EXECUTION SYSTEM AND RELAY SERVER

(71) Applicant: BROTHER KOGYO KABUSHIKI KAISHA, Nagoya-shi, Aichi-ken (JP)

(72) Inventor: Takafumi Mori, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 0 days.

(21) Appl. No.: 14/645,596

(22) Filed: Mar. 12, 2015

(65) Prior Publication Data
US 2015/0281500 A1 Oct. 1, 2015

(30) Foreign Application Priority Data

Mar. 31, 2014 (JP) ................................. 2014-073022

(51) Int. Cl.
*H04N 1/00* (2006.01)
*H04N 1/21* (2006.01)

(52) U.S. Cl.
CPC ......... *H04N 1/00928* (2013.01); *H04N 1/0097* (2013.01); *H04N 1/00244* (2013.01); *H04N 1/00891* (2013.01); *H04N 1/00973* (2013.01); *H04N 1/21* (2013.01); *H04N 2201/0094* (2013.01)

(58) Field of Classification Search
CPC combination set(s) only.
See application file for complete search history.

(56) References Cited

U.S. PATENT DOCUMENTS

| 8,065,417 | B1 * | 11/2011 | Richardson | ...... H04N 21/26241 709/226 |
| 2008/0068647 | A1 | 3/2008 | Isobe et al. | |
| 2010/0122180 | A1 * | 5/2010 | Kamiyama | ....... G06F 17/30867 715/744 |
| 2012/0324110 | A1 * | 12/2012 | Kohli | ................... H04L 63/0281 709/226 |
| 2013/0125134 | A1 * | 5/2013 | Ota | ........................... G06F 3/12 718/106 |
| 2013/0185392 | A1 * | 7/2013 | Cho | ....................... H04L 67/42 709/217 |
| 2014/0280772 | A1 * | 9/2014 | Miyata | ...................... G06F 3/12 709/219 |
| 2014/0281033 | A1 * | 9/2014 | Inoue | .................. H04L 61/2007 709/245 |
| 2014/0286354 | A1 * | 9/2014 | Van De Poel | .......... G06F 9/542 370/463 |
| 2014/0355055 | A1 * | 12/2014 | Murakawa | ......... G06K 15/1825 358/1.15 |
| 2015/0022861 | A1 * | 1/2015 | Oguro | ................ G06K 15/1815 358/1.16 |
| 2015/0127835 | A1 * | 5/2015 | Zwaal | ................... H04L 67/142 709/227 |
| 2015/0134485 | A1 * | 5/2015 | Kim | ..................... H04L 41/5051 705/26.41 |
| 2015/0149623 | A1 * | 5/2015 | Numata | .................. H04L 43/04 709/224 |
| 2015/0150106 | A1 * | 5/2015 | Lund | ........................ H04L 63/08 726/7 |
| 2015/0195422 | A1 * | 7/2015 | Hakozaki | .................. G06F 3/12 358/1.15 |

FOREIGN PATENT DOCUMENTS

JP 2008-104143 A 5/2008

* cited by examiner

*Primary Examiner* — Barbara Reinier
*Assistant Examiner* — Henok A Shiferaw
(74) *Attorney, Agent, or Firm* — Scully, Scott, Murphy & Presser, PC

(57) ABSTRACT

An operation execution system including a relay server configured, upon reception of setting information transmitted from a service providing server, to store the setting information in its server memory, such that the stored setting information is associated with device specifying information. In case where the relay server is not communicable with a device specified by the device specifying information, the relay server transmits the setting information stored in the server memory, to the device, when the device has become communicable with the relay server. The relay server, which receives result information from the device, associates the setting information corresponding to the result information that has not yet been received, with setting-unattempted-status information, and associates the setting information corresponding to the result information that has been received, with setting-attempted-status information.

19 Claims, 5 Drawing Sheets

| No. | DEVICE ID | SETTING VALUES | STATUS INFORMATION |
|---|---|---|---|
| 1 | aaaaa | Menu=" SERVICE 1 ", Lock=true, URL=" http://www.dd.com" | SETTING UNATTEMPTED |
| 2 | bbbbb | Menu=" SERVICE 2 ", URL=" http://www.eee.com" | SETTING MADE SUCCESSFULLY |
| 3 | ccccc | Menu=" SERVICE 3 ", URL=" http://www.ff.com" | SETTING FAILURE MENU NUMBER EXCESS |

FIG.1B

OPERATION EXECUTION SYSTEM AND RELAY SERVER

CROSS REFERENCE TO RELATED APPLICATION

This application claims priority from Japanese Patent Application No. 2014-073022 filed on Mar. 31, 2014, the disclosure of which is herein incorporated by reference in its entirety.

BACKGROUND OF THE INVENTION

1. Field of the Invention

The present invention relates to an operation execution system and a relay server.

2. Discussion of Related Art

Conventionally, there is known an image processing system including MFP (Multi Function Peripheral), an authentication server and a plurality of service providing servers that are connected to one another via a network. In this image processing system, when the authentication server receives a user information from the MFP, a menu screen indicative of services corresponding to the user information is transmitted to the MFP. In such an image processing system, the transmission of the user information from the MFP to the authentication server is the prerequisite, namely, the power ON of the MFP is the prerequisite.

SUMMARY OF THE INVENTION

Whether setting in a device in accordance with a setting information transmitted to the device from a service providing server, can be made or not varies depending on various factors such as type of the device and an internal setting in the device. Therefore, commonly, it is necessary to determine whether the setting in the device in accordance with the setting information transmitted from the service providing server can be made or not, while the device is being powered ON. However, the device is not being necessarily powered ON. Further, the same problem takes place also when the device is OFF-line.

Where the service providing server transmits the setting information to the device via a relay server, it might be possible to employ an arrangement in which the relay server memorizes a setting status in the device and determines whether the setting in accordance with the setting information received from the service providing server can be made in the device, based on the memorized setting status. However, there is a possibility that setting is made in the device without reception of the setting information from outside the device or setting is made in the device in accordance with setting information transmitted from another service providing server. In this case, there is a risk that the setting conflicts with another setting.

The present invention was made in view of backgrounds as described above. It is therefore a first object of the invention to provide an operation execution system in which setting can be made in a device in accordance with information transmitted from a service providing server, irrespective of situation of the device, in an arrangement where a relay server is provided between the device and the service providing server. A second object of the invention is to provide a relay server in which setting can be made in a device in accordance with information transmitted from a service providing server, irrespective of situation of the device, in an arrangement where the relay server is provided between the device and the service providing server.

The first object of the invention may be achieved according to a first aspect of the invention, which provides an operation execution system comprising: a device including a device memory and configured to execute a particular operation; a service providing server provided on the Internet and configured to provide service that causes said device to execute the particular operation; and a relay server including a server memory and provided on the Internet, said relay server being configured to relay between said service providing server and said device, wherein said relay server is connectable with said device to communicate such that particular information transmitted from said relay server is receivable by said device, wherein said relay server and said service providing server are connected to be communicable with each other, wherein particular information transmitted from said service providing server is unreceivable by said device without via said relay server, the particular information being not requested by said device, wherein said service providing server is configured to execute: a first setting-information transmission processing for transmitting setting information and device specifying information to said relay server, such that the setting information is transmitted to make setting in said device and the device specifying information is transmitted to specify said device to which the setting information is to be directed, wherein said relay server is configured to execute: a setting-information reception processing for receiving the setting information and the device specifying information that have been transmitted from said service providing server in the first setting-information transmission processing; a first memory-control processing for storing, in said server memory, the setting information associated with the device specifying information that has been received together with the setting information in the setting-information reception processing; a first determining processing for determining whether said relay server is communicable with said device specified by the device specifying information; a second setting-information transmission processing for transmitting the setting information to said specified device, when it is determined in the first determining processing that said relay server is communicable with said specified device; and a third setting-information transmission processing for transmitting the setting information stored in said server memory, to said specified device, when it is determined in the first determining process that said relay server has become communicable with communicable with said specified device after once determined in the first determining process that said relay server is not communicable with said specified device, wherein said device is configured to execute: a setting storage processing for storing the received setting information in said device memory, upon reception of the setting information transmitted in one of the second setting-information transmission processing and the third setting-information transmission processing; and a result-information transmission processing for transmitting result information representing that the setting storage processing has been executed, to said relay server, upon execution of the setting storage processing, wherein said relay server is configured to execute: a result-information reception processing for receiving the result information transmitted from said device in the result-information transmission processing; a second memory-control processing for associating the setting information stored in said server memory, with status information representing a status of the setting in said device, in the second memory-control processing; the setting information is associated with setting-unattempted-status information when the result information has not been received in the result-information reception processing, the setting-unattempted-status information being one form of the status information; and the setting information is associated with setting-attempted-status information when the result information has been already received in the result-information reception processing, the setting-attempted-status information being another form of the status information, and a third memory-control processing for storing, in said server memory, notification information containing the status information that is to be notified to an external device that is connected to said relay server, together with the device specifying information corresponding to the setting information that is associated with the status information to be notified to the external device, such that the notification information is transmittable to the external device.

The operation execution system of the present invention can be embodied in various forms such as a processing execution device, a control device for controlling the processing execution device, a processing execution method, a program for establishing the operation execution system and a recording medium storing such a program. Further, the relay server and the device that can be used in the operation execution system of the present invention can be embodied in various forms such as a control device for controlling the relay server or the device and a program for establishing the relay server or the device.

The second object of the invention may be achieved according to a second aspect of the invention, which provides a relay server comprising: a communication portion; a server memory; and a control portion, wherein said communication portion is connected to a device to be communicable with the device, and is connected to a service providing server that are configured to provide service that causes the device to execute processing, wherein said control portion is configured to execute: a setting-information reception processing for receiving setting information and device specifying information that have been transmitted from said service providing server such that the setting information is received to make setting in the device and the device specifying information is received to specify the device to which the setting information is to be directed, a first memory-control processing for storing, in said server memory, the setting information associated with the device specifying information that has been received together with the setting information in the setting-information reception processing; a first determining processing for determining whether said relay server is communicable with said device specified by the device specifying information; a second setting-information transmission processing for transmitting the setting information to said specified device, when it is determined in the first determining processing that said relay server is communicable with said specified device; a third setting-information transmission processing for transmitting the setting information stored in said server memory, to said specified device, when it is determined in the first determining process that said relay server has become communicable with communicable with said specified device after once determined in the first determining process that said relay server is not communicable with said specified device, a result-information reception processing for receiving, from the device that has received the setting information transmitted in one of the second setting-information transmission processing and the third setting-information transmission processing, result information representing that the device has executed a setting storage processing for storing the received setting information in a device memory included in the device, a second memory-control processing for associating the setting information stored in said server memory, with status information representing a status of the setting in the device, in the second memory-control processing; the setting information is associated with setting-unattempted-status information when the result information has not been received in the result-information reception processing, the setting-unattempted-status information being one form of the status information; and the setting information is associated with setting-attempted-status information when the result information has been already received in the result-information reception processing, the setting-attempted-status information being another form of the status information, and a third memory-control processing for storing, in said server memory, notification information containing the status information that is to be notified to an external device that is connected to said relay server, together with the device specifying information corresponding to the setting information that is associated with the status information to be notified to the external device, such that the notification information is transmittable to the external device.

BRIEF DESCRIPTION OF THE DRAWINGS

FIG. 1B is a view schematically showing a setting management table by way of example.

DETAILED DESCRIPTION OF THE PREFERRED EMBODIMENT

There will be described preferred embodiment of the present invention, with reference to drawings attached hereto. It is noted that the term "information" is used as a broader term encompassing the term "data" in the claims and the specification. For example, the term "data A" may be referred also to as "information A". It is further noted that, even if the "data" and "information" are changed in format (e.g., text form, binary form, flag form) depending on computer, the "data" and "information" may be handled as the same "data" and "information", as long as the format change does not cause change in the meaning and contents. For example, information indicative of "two" may be held as information represented by a text format in the form of "0×32" as ASCII code in a computer, and may be held as information represented by a binary format in the form of "10" as binary number in another computer. It is still further noted that the "data" and the "information" do not have to be distinguished strictly from each other, so that use of these terms in exceptional manners are allowed.

Figure 1A:
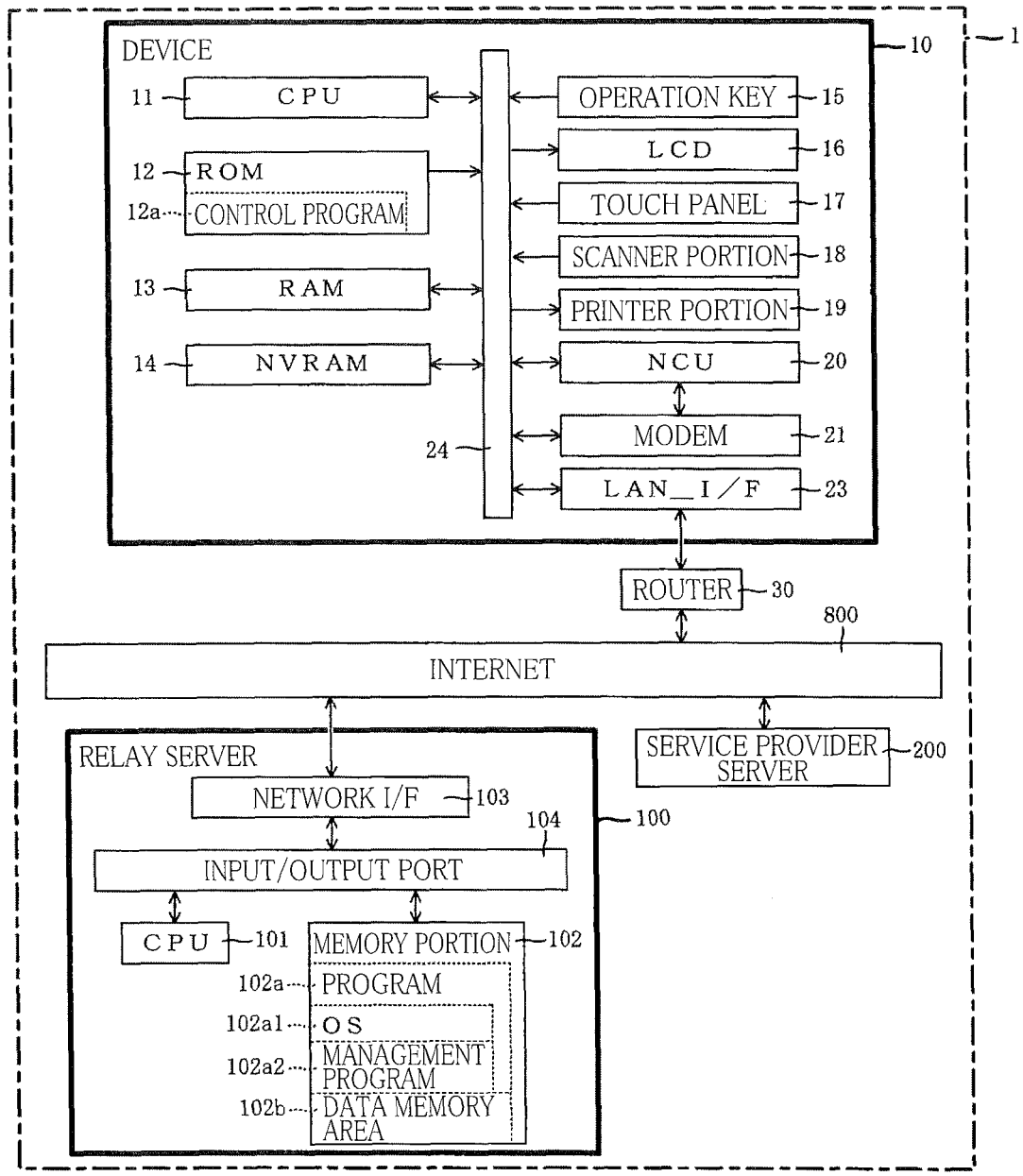
FIG. 1A is a block diagram showing a construction of an operation execution system by way of example.

FIG. 1A is block diagram showing a construction of an operation execution system 1 as an example of the operation execution system according to the present invention. The operation execution system 1 includes a device 10, a relay server 100 and a service providing server 200.

In the present embodiment, the device 10 is a multi function peripheral having various functions such as print, scan, copy and facsimile functions. The service providing server 200 is a server that provides serves causing the device 10 to execute particular operations. In this embodiment, the service providing server 200 constitutes a server that causes the device 10 to execute a printing operation using the print function. The relay server 100 constitutes a server that relays communication between the device 10 and the service providing server 200.

The relay server 100 stores a setting information transmitted from the service providing server 200 such that the stored setting information is associated with a status information representing a status of the setting in the device 10 in accordance with the setting information. In case that the service providing server 200 transmits the setting information with reference to the status information, and the device 10 to which the setting information is directed is being powered OFF at a timing of the transmission of the setting information by the service providing server 200, the relay server 100 can transmit the setting information to the device 10 upon satisfaction of a condition that the device 10 (to which the setting information is directed) is powered ON. Thus, irrespective of situation of the device 10, the service providing server 200 can attempt to make setting in the device 10 in accordance with the setting information.

The device 10 is connected to the Internet 800 via a router 30. The relay server 100 and the service providing server 200 are also connected to the Internet 800. The communication between the device 10 and the relay server 100 is made in accordance with a connection-establishment type protocol, specifically, XMPP over BOSH (Extensible Messaging and Presence Protocol Over Bidirectional-Streams Over Synchronous HTTP). The XMPP over BOSH may be referred also to as a constant-connection type protocol or a connection-keeping type protocol, since it almost constantly keeps a state in which the connection is established. Meanwhile, the communication between the device 10 and the service providing server 200 is made in accordance with HTTP (Hypertext Transfer Protocol).

As described above, the device 10 is connected to the Internet 800 via the router 30. The router 30 allows transmission of information transmitted from the device 10 to the Internet 800 and transmission of reply to the information (transmitted from the device 10), but blocks transmission of other information (that is other than the reply to the information transmitted from the device 10) from the Internet 800 to the device 10. Thus, the service providing server 200 cannot transmit information to the device 10.

In the communication between the device 10 and the relay server 100 in accordance with the connection-establishment type protocol, information requesting the connection establishment is periodically transmitted from the device 10 to the relay server 100. Thus, information, which is to be transmitted to the device 10, can be transmitted from the relay server 100 to the device 10 through the connection that has been established by one of the informations each requesting the connection establishment. With the connection being established, the router 30 can allow transmission therethrough of information transmitted to the device 10 from the Internet 800. It is therefore possible to carry out so-called server push so that, when the relay server 100, which has the connection with the device 10 in accordance with the connection-establishment type protocol, transmits information (that is generated on the Internet and is to be transmitted to the device 10) to the device 10 via the router 30, the device 10 receives the transmitted information. That is, the server push is processing including (i) a transmission processing in which an Internet-side device provided on the Internet transmits information generated on the Internet, to the device connected to the Internet via the router, (ii) a relay processing in which the router relays the information transmitted from the Internet-side device, and (iii) a reception processing in which the device receives the information relayed by the router. It is noted that the server push does not processing in which a request generated by the device and specifying required information is transmitted to the Internet-side device via the router, and the information specified by the request is transmitted back to the device via the router. The server push can be realized by, for example, the connection using the XMPP over BOSH, as in the present embodiment. However, it is not limited to the details of the present embodiment, as long as the information generated on the Internet and transmitted from the Internet-side device can be relayed by the router to the device The communication between the device 10 and the relay server 100 is established in accordance with the connection-establishment type protocol, as described above. The link of the communication is cut when a given length of period elapses since the connection has been established. When the link of the communication in accordance with the connection-establishment type protocol is cut, information transmitted from the relay server 100 and directed to the device 10 is blocked by the router 30 so that information cannot be transmitted from the relay server 100 to the device 10. In the present embodiment, after the communication has been established, the device 10 requests the communication establishment at a certain cycle time (e.g., one minute) that is shorter than the above-described given length of period, to the relay server 100, for keeping the communication establishment in accordance with the connection-establishment type protocol. It is noted that the above-described certain cycle is not precisely the constant cycle but may vary by some degree.

The device 10 is provided with, for example, CPU 11, ROM 12, RAM 13, NVRAM 14, an operation key 15, LCD 16, a touch panel 17, a scanner portion 18, a printer portion 19, NCU 20, a modem 21, a LAN interface (hereinafter simply referred to as "LAN_I/F") 23. These components of the device 10 are connected to one another via an input/output port 24.

Figure 4A:
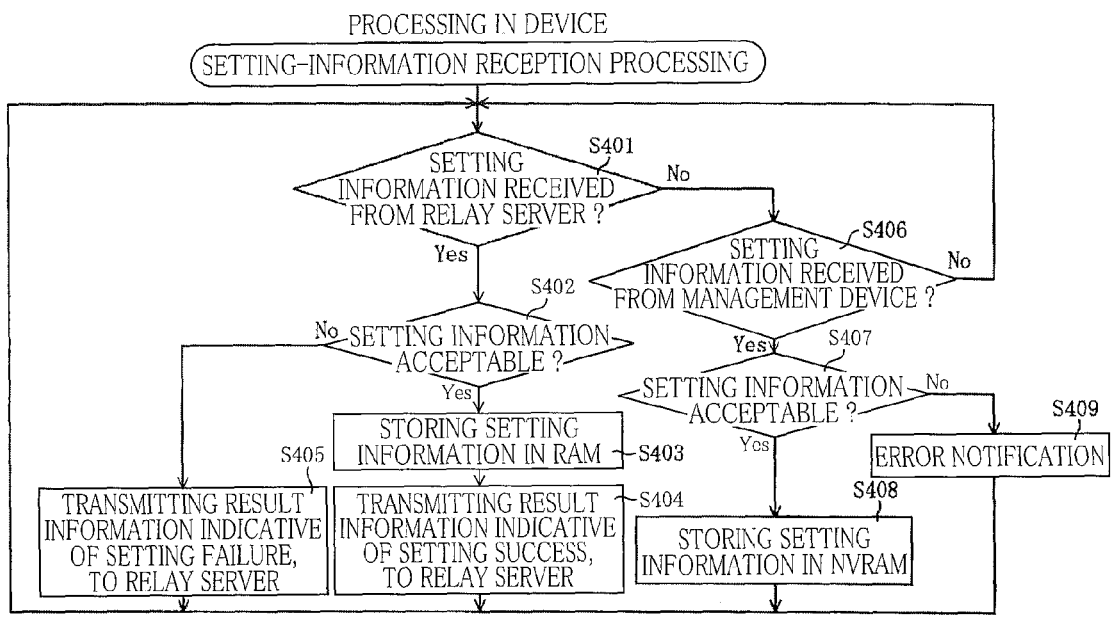
FIGS. 4A and 4B are flow charts showing a setting-information reception processing and a power-ON-state processing that are to be executed by a device of the operation execution system.
Figure 4B:
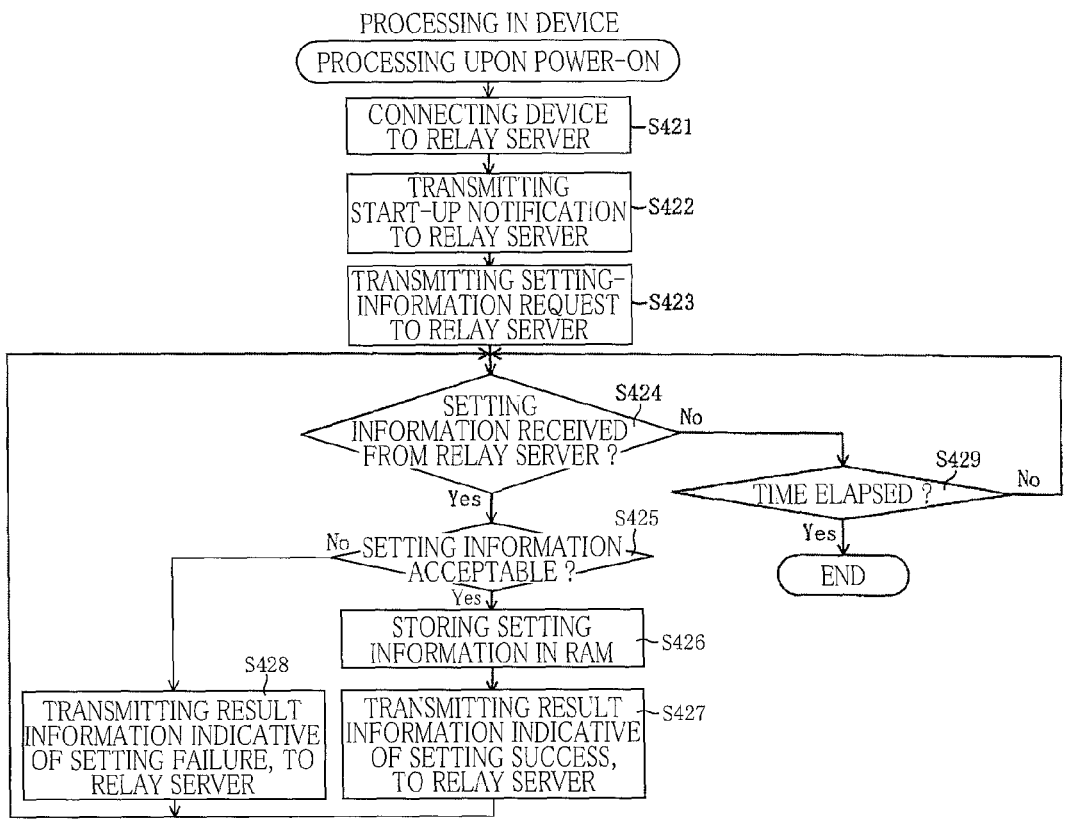

The CPU 11 controls various functions of the device 10 and the various components connected to the input/output port 24, in accordance with programs and data stored in the ROM 12, RAM 13, NVRAM 14 or various signals transmitted/received via the NCU 20. The ROM 12 is read only memory storing various programs executed by the CPU 22 and also constants and tables that are used upon execution of the programs. For example, control programs 12a used for operations of the device 10 are stored in the device 10. FIGS. 4A and 4B are flow charts showing various processing to be executed by the CPU 11 in accordance with the control programs 12a.

The RAM 13 is a rewritable volatile memory having a temporary area for temporarily storing therein various data upon execution of the control programs 12a by the CPU 11. The NVRAM 14 is a non-volatile RAM.

The operation key 15 is a mechanical key provided on a casing body and configured to receive various setting values and commands from a user. The LCD 16 is an optional liquid crystal display and configured to display various screens. The touch panel 17 is superposed on the LCD 16. The touch panel 17 is configured, when a pointing body such as a fingertip and a stick is brought into contact or approximation with the display surface of the LCD 16, to detect a position of the contact or approximation and input the detected position to the device 10.

The scanner 18 reads a script and converts into image data. The printer portion 19 prints, on a recording sheet, an image based on the image data. The modem 21 modulates the image data into signals transmittable to a telephone network (not shown) and then transmits the signals via the NCU 20 in FAX transmission. Further, the modem 21 demodulates signals inputted from the telephone network via the NCU 20, into image data. The NCU 20 is provided to connect the telephone network and the device 10, and controls the connection between the telephone network and the device 10 by connecting or disconnecting the connection line in accordance with instruction provided from the modem 21. The LAN_I/F 23 is an interface for enabling the device 10 to carry out communication via a local area network. The LAN_I/F 23 is connected to the router 30.

The relay server 100 is provided with, for example, CPU 101, a memory 102 and a network interface (hereinafter referred to as "network I/F") 103. These components of the relay server 100 are connected to one another via an input/output port 104. The CPU 101 controls the various components connected to the input/output port 104, in accordance with programs and data stored in the memory 102.

The memory 102 stores therein programs 102a that include an operating system (hereinafter referred to as "OS") 102a1 and a management program 102a. The memory 102 may be a computer-readable storage medium that is a non-transitory medium. The non-transitory medium is constituted by, for example, RAM, ROM, EEPROM (Electrically Erasable Programmable Read-Only Memory), HDD, a buffer of CPU, or their combination. The RAM, ROM, EEPROM, HDD, buffer of CPU and their combination are tangible media. It is noted that electrical signal carrying programs downloaded from servers provided on the Internet are a computer-readable signal medium as a kind of computer-readable medium but is not included in the non-transitory computer-readable storage medium.

Figure 3:
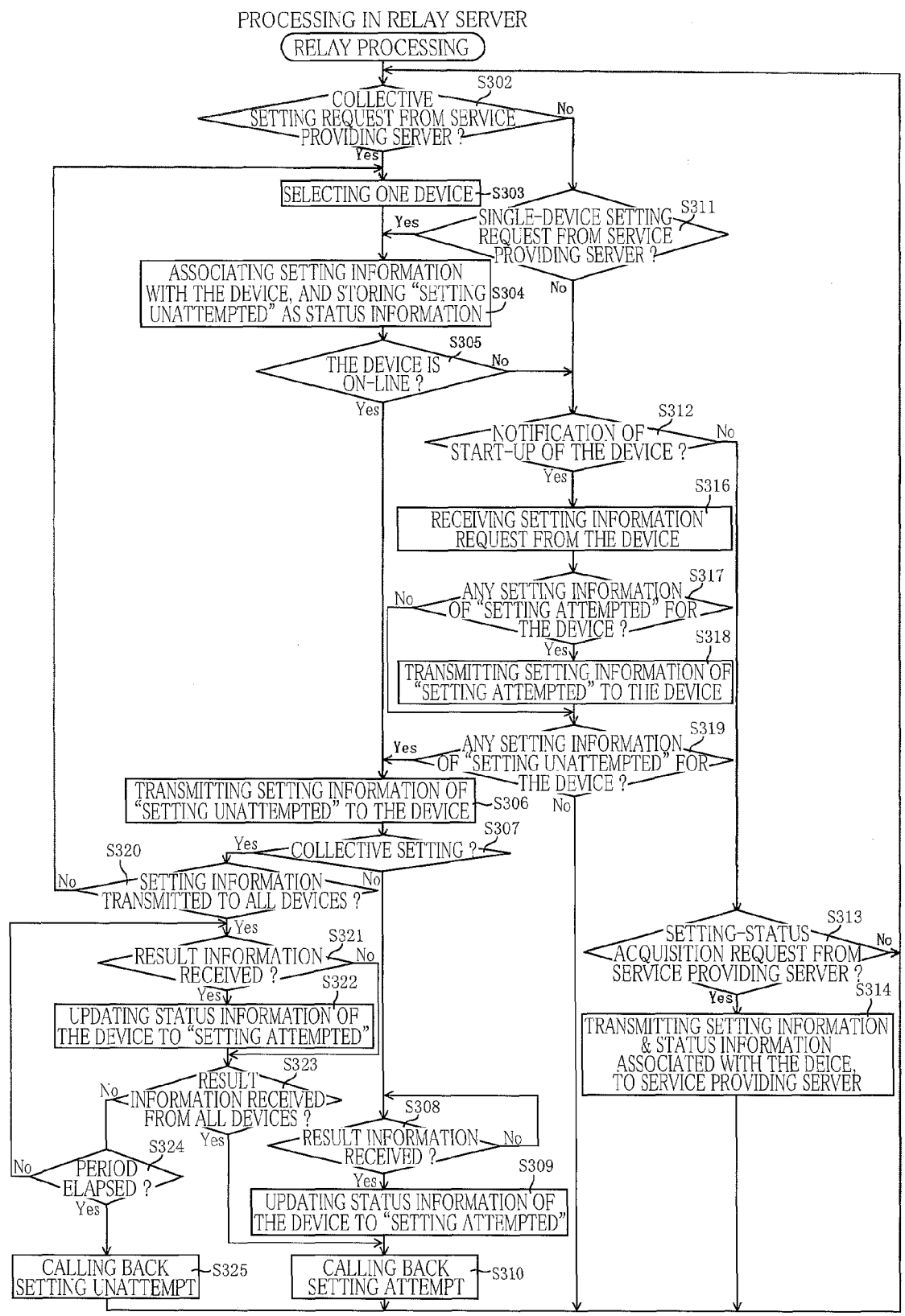
FIG. 3 is a flow chart showing a relay processing that is to be executed by a relay server of the operation execution system.

The OS 102a1 is a program for providing basic functions to be used in the management programs 102a2. The OS 102a1 includes programs for controlling the memory 102. The management program 102a2 is a program for managing status information received from the device 10. FIG. 3 is a flow chart showing various processing to be executed by the CPU 101 in accordance with the management program 102a2. In the following description, the CPU 101 executing programs such as programs of the OS 102a1 and the management program 102a2 will be represented simply by the name of the program, where appropriate. For example, there is case where the term "management program" represents "CPU 101 executing the management program".

The memory 102 is provided with a data memory area 102b in which various data are to be stored. The management program 102b outputs various data via the OS 102a1, for storing the data in the data memory area 102b. The management program 102b acquires various data stored in the data memory area 102b, via the OS 102a1.

As described later in detail, a setting management table is stored in the non-volatile data memory area 102c of the memory 102. The setting management table is a table for managing the setting information transmitted from the service providing server 200. FIG. 1A is a view schematically showing the setting management table by way of example. In the setting management table, a device ID 122, setting values 123 and status information 124 are associated with a control number 121.

The device ID 122 is information specifying a device to which the setting information is to be directed. The device ID 122 is to be transmitted together with the setting information from the service providing server 200. The setting values 123 include the setting information and destination information. The destination information represents a destination or address to which the relay server 100 calls back the service provided server 200.

The status information 124 is information representing a setting status of the setting information in the device 10. The status information contains information (hereinafter referred to as "setting-unattempted-status information") representing that the setting in accordance with the setting information transmitted from the service providing server 200 has not yet been attempted in the device 10 and information (hereinafter referred to as "setting-attempted-status information") representing that the setting in accordance with the transmitted setting information has been already attempted in the device 10. More specifically, the setting-attempted-status information is categorized into two kinds of information that are distinguishable from each other depending on whether the setting in accordance with the setting information was made in the device 10 successfully or not. In the following description, the setting-attempted-status information representing success in the setting will be referred to as "success information" and the setting-attempted-status information representing failure in the setting will be referred to as "failure information", where appropriate.

In an example shown in FIG. 1B, the setting-unattempted-status information is represented by "SETTING UNATTEMPTED", the success information is represented by "SETTING MADE SUCCESSFULLY", and the failure information is represented by "SETTING FAILURE". When the failure information is stored as the status information 124, there is added an error code indicative of cause of the error. In the example of FIG. 1B, the error code indicative of "MENU NUMBER EXCESS" is added to the failure information.

Figure 2A:
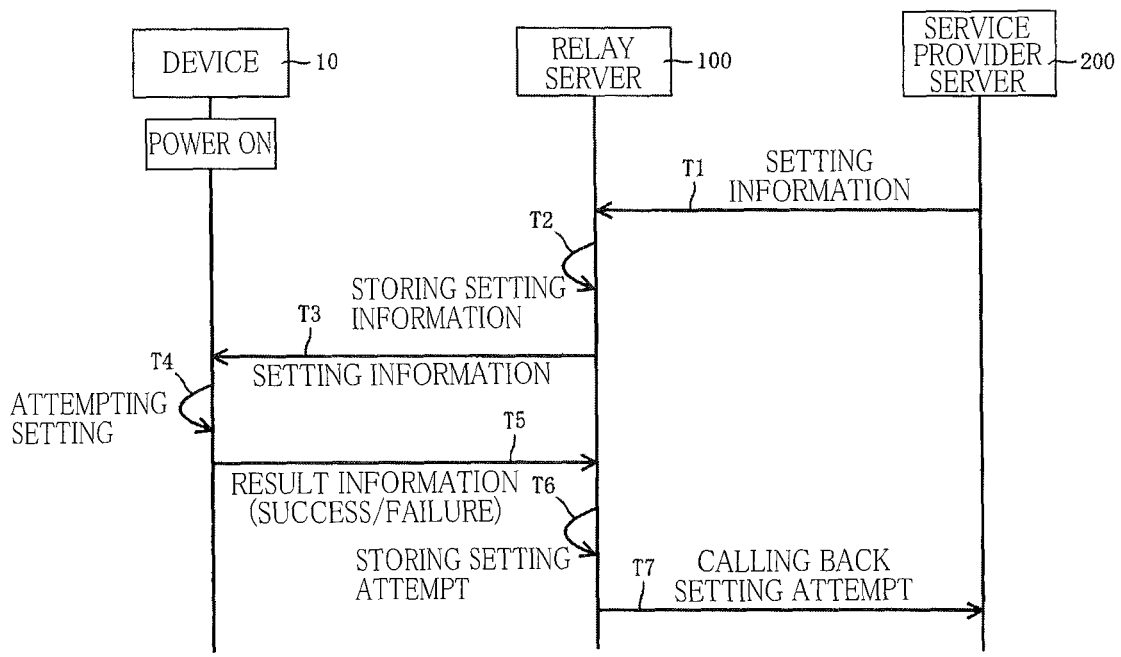
FIGS. 2A and 2B are sequence diagrams showing operations of respective components of the operation execution system.
Figure 2B:
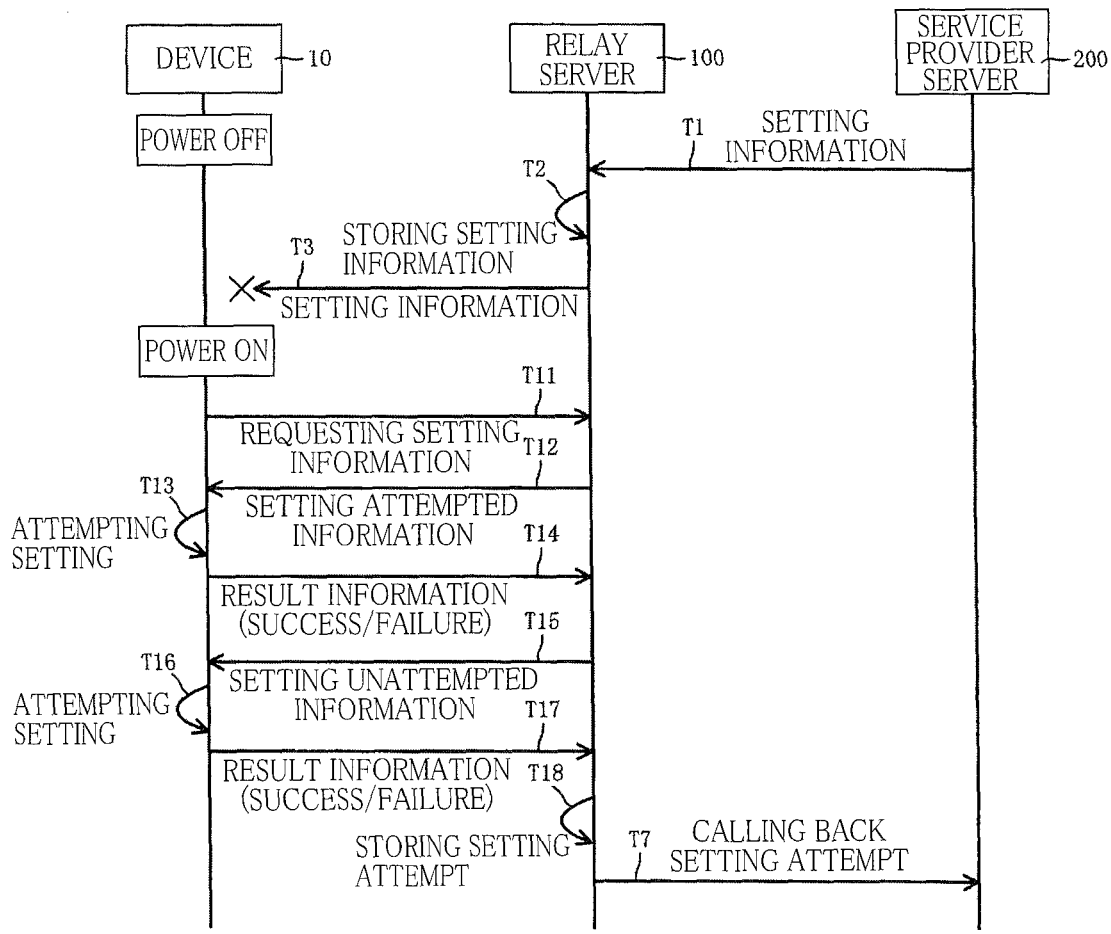

Referring next to FIGS. 2A and 2B, there will be described operations of the device 10, relay server 100 and service providing server 200 when the setting information is transmitted from the service providing server 200 to the device 10 in the operation execution system 1. FIG. 2A is a sequence diagram in case where the device 10 is being powered ON at a point of time at which the setting information is transmitted from the service providing server 200 to the device 10.

The service providing server 200 transmits a setting request in the form of the setting information, information requesting setting in accordance with the setting information, the device ID and the destination information (T1). As the setting information, there are, for example, information representing menu items to be displayed in the device 10 and information representing a lock setting for limiting operations on a login screen that is to be displayed in the device 10 upon start-up of the device 10.

When the relay server 100 receives information such as the setting information from the service providing server 200, the relay server 100 stores the received information in a setting management table (T2). In this instance, the relay server 100 associates the received information with the setting-unattempted-status information as the status information. Then, the relay server 100 transmits the received setting information to the device 10 that is specified by the device ID (T3).

The device 10 executes setting processing for making setting in accordance with the received setting information (T4). If the setting information is acceptable in the device 10 (if the setting information is information in accordance with which the setting can be made in the device 10), the device 10 stores the setting information in the RAM 13, whereby the setting processing is successfully completed. On the other hand, if the setting information is not acceptable in the device 10 (if the setting information is information in accordance with which the setting cannot be made in the device 10), the device 10 does not store the setting information in the RAM 13, so that the setting processing ends with failure. As an examples of failure in the setting processing, there is case where the setting information requests adding of more menu items in the device 10 when the number of already-set menu items has already reached the maximum number of settable menu items. As another examples of failure in the setting processing, there is case where the setting information requests limitation on operation of a certain function when the operation of the same function has been already limited by setting already made in accordance with setting information provided from a service providing server that is other than the service providing server 200, namely, in case where the setting information provided from the service providing server 200 conflicts with setting information that had been provided from another service providing server.

The device 10 transmits, together with its own device ID and the setting information, information (hereinafter referred to as "result information) representing whether the setting in accordance with the setting information was made successfully or not (T5). Upon reception of the result information, the relay server 100 switches the corresponding status information stored in the setting management table, from the setting-unattempted-status information to the setting-attempted-status information (T6). More specifically, the relay server 200 changes the status information from the setting-unattempted-status information to the success information or failure information, depending on contents of the result information. Then, the relay server 100 calls back to transmit information containing the status information and representing that the setting has been completed, to an address represented by the corresponding destination information stored in the setting management table (T7).

FIG. 2B is a sequence diagram in case where the device 10 is being powered OFF at a point of time at which the setting information is transmitted from the service providing server 200 to the device 10. In the following description relating to the case of FIG. 2B, there will not be described steps T1, T2, T3, T7 that are substantially the same as in the above-described FIG. 2A. However, at step T3 in the case of FIG. 2B, the setting information transmitted from the relay server 100 is not received by the device 10 specified by the device ID.

With the power being switched from OFF to ON, the device 10 transmits a setting-information request to the relay server 100 (T11). Upon reception of the setting-information request transmitted from the device 10, the relay server 100 transmits the setting information which is in the setting management table and which corresponds to the device 10 having transmitted the setting-information request, such that the transmitted setting information is directed to the corresponding device 10. In the present embodiment, in transmission of the setting information by the relay server 100, among the corresponding setting information, a higher priority is given to the setting information associated with the setting-attempted-status information (T12). That is, the relay server 100 transmits the setting information associated with the setting-attempted-status information earlier than the setting information associated with the setting-unattempted-status information. Thus, the device 10 makes the setting in accordance with the setting information associated with the setting-attempted-status information, with a higher priority (T13). Then, the device 10 transmits, together with its own device ID and the setting information, the result information representing the result of step T13 (T14).

Then, the relay server 100 transmits the setting information associated with the setting-unattempted-status information, to the device 10 (T15), and the device 10 makes the setting in accordance with the setting information associated with the setting-unattempted-status information (T16). The device 10 transmits, together with its own device ID and the setting information, the result information representing the result of step T16 (T17). The relay server 100 updates the corresponding status information stored in the setting management table, depending on the result information transmitted from the device 10 at step T14 or T17 (T18).

The device 10 stores the setting information provided from the service providing server 100, in RAM 13, so that the setting information is erased upon power OFF of the device 10. Upon power ON of the device 10, if the setting information associated with the setting-unattempted-status information is earlier transmitted by the relay server 100 and the setting is made in accordance with the setting information associated with the setting-unattempted-status information, there is a risk that the setting, which had been made before the power OFF of the device 10 in accordance with the setting information associated with the setting-attempted-status information, cannot be made due to some reasons such as excess of the maximum setting. On the other hand, in the present embodiment, when the device 10 is powered ON, the relay server 100 transmits the setting information associated with the setting-attempted-status information earlier than the setting information with the setting-unattempted-status information, so that the above problem can be avoided.

FIG. 3 is a flow chart showing relay processing that is to be executed by the CPU 101 of the relay server 100, in accordance with the management program 102a2. This processing is initiated upon power ON of the relay server 100.

The CPU 101 waits for a collective setting request, a setting request for one of the devices 10, a start-up notification or a setting-status acquisition request, from the device 10 or the service providing server 200 (S302: No, S311: No, S312: No, S313: No).

Where the relay server 100 receives, from the service providing server 200, the setting request for a single one of the devices 10 (S302: No, S311: Yes), the CPU 101 associates the setting information, device ID and destination information contained in the received setting request, with one another, and also associate these information with the setting-unattempted-status information as the status information. The CPU 101 stores these associated information in a setting management table (S304). The processing executed at S304 corresponds to the processing executed at T2 in the sequence diagrams of FIGS. 2A and 2B.

The CPU 101 determines whether the subject device 10 (i.e., the above-described single one of the devices 10) is ON-line or not (S305). Where the CPU 101 determines that the subject device 10 is ON-line (S305: Yes), the CPU 101 transmits the setting information associated with the device ID (representing the subject device 10) and also with the setting-unattempted-status information, to the subject device 10, with reference to the setting management table (S306). At S306 which is executed when the subject device 10 is ON-line, the setting information transmitted from the relay server 100 to the subject device 10 is the setting information that has been received from the service providing server 200. The processing executed at S306 corresponds to the processing executed at T3 in the sequence diagrams of FIGS. 2A and 2B.

The CPU 101 determines whether the collective setting for a plurality of devices 10 is being executed or not (S307). Where the CPU 101 determines that the collective setting is not being executed, namely, the setting based on the setting request for a single one of the devices 10 is being executed (S307: No), the CPU 101 waits for reception of the result information from the device 10 (S308: No).

Upon reception of the result information (S308: Yes), the CPU 101 updates the status information associated with the device ID and the setting information received together with the result information, so as to change from the setting-unattempted-status information to the setting-attempted-status information (S309). More specifically, the CPU 101 updates the corresponding status information to the success information or the failure information, depending on the received result information. It is noted that the CPU 101 may skip the implementation of S309 in case where the setting information corresponding to the received result information is already associated with the setting-attempted-status information, so that the processing for rewriting the setting-attempted-status information into the setting-attempted-status information is not executed whereby the processing load can be alleviated. The processing executed at S309 corresponds to the processing executed at T6 and T18 in the sequence diagrams of FIGS. 2A and 2B.

The CPU 101 calls back to transmit information containing the status information representing that the setting has been completed, to the service providing server 200 from which the setting information had been transmitted (S310), and then the control flow goes back to S302. In S310, the CPU 101 stores a set of information to be called back, in a transmission buffer provided in the memory 102, so as to transmit the set of information from the transmission buffer to the service providing server 200. The call-back destination is an address represented by the destination information, which is associated with the device ID representing the subject device 10 in the setting management table. The processing executed at S310 corresponds to the processing executed at T7 in the sequence diagrams of FIGS. 2A and 2B.

In the present embodiment, when the setting is being made based on the setting request for a single one of the devices 10, the CPU 101 makes the call-back in case of satisfaction of a condition that the status information has been changed from the setting-unattempted-status information to the setting-attempted-status information. Thus, it is possible to restrain a call-back relating to the setting information in accordance with which the setting had been already made in a device, and accordingly to alleviate the communication load. Further, the processing load of the service providing server 200 can be alleviated, too.

Where the CPU 101 determines that the subject device 10 is not ON-line and is OFF-line (S305: No), after reception of the start-up notification transmitted from the subject device 10 (S312: Yes), the CPU 101 receives the setting-information request transmitted from the device 10 that has transmitted the start-up notification (S316). In the present embodiment, when the device 10 is OFF-line, it is regarded that the device 10 is being powered OFF.

With reference to the setting management table, the CPU 101 determines whether there is setting information associated with the setting-attempted-status information as the status information, among setting information associated with the device ID representing the subject device 10, i.e., the device 10 from which the start-up notification has been transmitted (S317).

Where the CPU 101 determines that there is setting information associated with the setting-attempted-status information (S317: Yes), the CPU 101 transmits the setting information associated with the setting-attempted-status information, to the subject device 10 (S318). S318 is followed by S319. The processing executed at S318 corresponds to the processing executed at T12 in the sequence diagrams of FIGS. 2A and 2B. On the other hand, where the CPU 101 determines that there is no setting information associated with the setting-attempted-status information (S317: No), the CPU 101 skips implementation of S318 so that the control flow goes to S319.

With reference to the setting management table, the CPU 101 determines whether there is setting information associated with the setting-unattempted-status information as the status information, among setting information associated with the device ID representing the subject device 10 (S319). Where the CPU 101 determines that there is no setting information associated with the setting-unattempted-status information (S319: No), the control flow goes back to S302. On the other hand, where the CPU 101 determines that there is setting information associated with the setting-unattempted-status information (S319: Yes), the CPU 101 transmits the setting information associated with the setting-unattempted-status information, to the subject device 10 (S306). The processing, which is executed at S306 in case of the reception of the start-up notification by the relay server 100, corresponds to the processing executed at T15 in the sequence diagrams of FIGS. 2A and 2B.

Where the relay server 100 receives, from the service providing server 200, the collective setting request that requests the setting to be made in every one of the plurality of devices 10 (S302: Yes), the control flow goes to S303. The collective setting request contains information requesting the setting to be made in every one of the devices 10, the setting information, the device ID of every one of the devices 10 and the destination deformation. The CPU 101 selects one device 10 from among the plurality of devices 10 that are subjected to the collective setting (S303), and executes processing of S304-S307 and S315-S319 for the selected one device 10.

Where the collective setting is being executed, after implementation of S306, the CPU 101 determines whether the setting information has been transmitted to all of the devices 10 subjected to the collective setting (S307: Yes, S320). When the CPU 101 determines that the setting information has not yet been transmitted to at least one of the devices 10 subjected to the collective setting (S320: No), the control flow goes to S303 so that the CPU 101 executes processing for the next one of the devices 10.

On the other hand, when the CPU 101 determines that the setting information has been transmitted to all of the devices 10 subjected to the collective setting (S320: Yes), the CPU 101 waits for reception of the result information transmitted from all of the devices 10 subjected to the collective setting within a certain period of time (e.g., one day) (S321: No, S323: No, S324: No). Upon reception of the result information transmitted from each one of the devices 10, the CPU 101 updates the status information corresponding to the received result information, from the setting-unattempted-status information to the setting-attempted-status information (S322). Like the implementation of S309, the implementation of S322 may be skipped in case where the setting information corresponding to the received result information is already associated with the setting-attempted-status information.

Where the result information has been received from all of the devices 10 subjected to the collective setting within the certain period of time (S323: Yes), the CPU 101 calls back to the service providing server 200 (from which the collective setting request had been transmitted) so as to transmit the status information in the form of information representing that the collective setting has been attempted (S310), and then the control flow goes back to S302.

On the other hand, where the result information has not been received from all of the devices 10 subjected to the collective setting within the certain period of time (S324: Yes), the CPU 101 calls back to the service providing server 200 (from which the collective setting request had been transmitted) so as to transmit the status information in the form of information representing that the collective setting has not been attempted (S325), and then the control flow goes back to S302. At S325, the CPU 101 stores a set of information to be called back, in the transmission buffer provided in the memory 102, so as to transmit the set of information from the transmission buffer to the service providing server 200.

At S325, when the CPU 101 calls back to transmit information representing that the collective setting has not been completely attempted, the CPU 101 informs, based on the contents of the setting management table, the device ID of the device 10 associated with the setting-attempted-status information and the device ID of the device 10 associated with the setting-unattempted-status information, to the service providing server 200. Thus, it is possible to inform in which one or ones of the devices 10 subjected to the collective setting the setting has been attempted. In this instance, only the device ID of the device 10 associated with the setting-attempted-status information may be informed.

Where the relay server 100 receives the start-up notification transmitted from one of the devices 10 (S311: No, S312: Yes), the CPU 101 executes processing of S316-S319 and S306-S310 for the device 10 from which the start-up notification has been transmitted.

Where the relay server 100 receives the setting-status acquisition request transmitted from the service providing server 200 (S312: No, S313: Yes), the CPU 101 transmits the setting information and the status information associated with the device ID that are included in the received setting-status acquisition request, to the service providing server 200 from which the setting-status acquisition request had been transmitted, in view of the setting management table (S314). Then, the control flow goes back to S302. In S314, the CPU 101 stores a set of information to be responded to the setting-status acquisition request, in the transmission buffer provided in the memory 102, so as to transmit the set of information from the transmission buffer to the service providing server 200. In this instance, the CPU 101 transmits the setting information and the status information, to the address represented by the destination information that is contained in the setting-status acquisition request.

FIG. 4A is a flow chart showing setting-information reception processing that is to be executed, by the CPU 11 of the device 10, in accordance with the control program 12a. This processing is initiated after execution of power-ON-state processing that will be described later. This processing is executed repeatedly as long as the device 10 is being powered ON.

The CPU 11 waits for reception of the setting information from the relay server 100 or a management device of the device 10 (S401: No, S406: No). In the present embodiment, the device 10 has a web server built therein. The management device may be a personal computer or other device capable of transmitting the setting information by accessing to the web server built in the device 10. The management device may be a plurality of management devices.

When the device 10 receives the setting information transmitted from the relay server 100 (S401: Yes), the CPU 11 determines whether the received setting information is acceptable or not under the current situation of the device 10, namely, whether the setting in accordance with the received setting information can be made in the device 10 under the current situation (S402). At S402, a negative determination is obtained, for example, when the number of already-set items has already reached the maximum number of settable items, when the setting in accordance with the received setting information conflicts with the same kind of setting that has been already made, or when the setting in accordance with the received setting information cannot be made in the device 10 due to the type of the device 10.

Described more specifically, in case where the maximum number of displayable menu items in the device 10 is ten, if the device 10 receives setting information that requests adding of more menu items when the number of already-set menu items has already reached ten as the maximum number of displayable menu items, the CPU 11 makes the negative determination at S402 for preventing problem that could take place by causing the number of the currently-set menu items to exceed the maximum number of displayable menu items.

Further, in case where a lock setting for inhibiting the functions of the device 10 from being used without via the relay server 100 has been made in accordance with setting information stored in the device 10, if the device 10 receives another setting information that allows the use of the functions of the device 10 without via the relay server 100, the CPU 11 makes the negative determination at S402 because the received another setting information conflicts with the already stored setting information. Owing to this arrangement, it is possible to prevent problem that use of the print function, scan function, facsimile function or other function of the device 10 by pressing buttons provided in the device 10 could be allowed by the newly received another setting information in spite of the already-made setting that inhibits the use of the functions of the device 10 without via the relay server 100. Further, it is possible to prevent the functions of the device 10 from being used by commands that is transmitted, without via the relay server 100, from a personal computer connected to the device 10 via LAN. It is noted that the lock setting may be made for the respective functions of the device 10, independently and differently from one another.

The information representing the maximum number serving as a determination criteria at S402 is, for example, information that the device 10 has received from the service providing server 200 via the relay server 10. Thus, it is possible to prevent problem that could take place by conflict between the setting information received from the service providing server 200 and another setting information received from another service providing server 200 via the relay server 100.

As another example of information serving as the determination criteria at S402, there is information that is received from an external device without via the relay server 100, so that it is possible to prevent problem that could take place by conflict between the setting information received from the service providing server 200 and another setting information received from the external device without via the relay server 100.

As still another example of information serving as the determination criteria at S402, there is information which is dependent on the type of device 10 and which has been stored in the ROM 12 when the device 10 was manufactured. Thus, it is possible to prevent problem that could take place by conflict between the setting information received from the service providing server 200 and the information that was stored when the device 10 was manufactured.

Where the CPU 11 determines that the received setting information is acceptable in the device 10, namely, determines that the setting in accordance with the received setting information can be made in the device 10 (S402: Yes), the CPU 11 stores the received setting information in the RAM 13 (S403), whereby the setting in accordance with the setting information is successfully completed. The processing executed at S403 corresponds to the processing executed at T4 in the sequence diagrams of FIGS. 2A and 2B.

The CPU 11 transmits the result information representing the setting success, together with the corresponding setting information and the device ID representing its own device, to the relay server 100 (S404), and then the control flow goes back to S401. The processing executed at S404 corresponds to the processing executed at T5 in the sequence diagrams of FIGS. 2A and 2B. As a result of execution of the processing at S404, the relay server 100 receives the result information, and updates the status information depending on the contents of the result information. The status information to be updated is information which is stored in the setting management table and which is associated with the setting information and the device ID received together with the result information.

On the other hand, where the CPU 11 makes the negative determination at S402 (S402: No), the CPU 11 transmits the result information representing the setting failure, the corresponding setting information and the device ID representing its own device, to relay server 100, without storing the setting information in the RAM 13 (S405), and the control flow goes back to S401. That is, the CPU 11 transmits information representing that the CPU 11 attempted to store the setting information so as to make setting in accordance with the setting information but failed to do it, to the relay server 100. The processing executed at S405 corresponds to the processing executed at T5 in the sequence diagrams of FIGS. 2A and 2B. As a result of execution of the processing at S405, the relay server 100 receives the result information, and updates the status information depending on the contents of the result information. The status information to be updated is information which is stored in the setting management table and which is associated with the setting information and the device ID received together with the result information.

Where the device 10 receives setting information the management device without via the relay server 100 (S406: Yes), the CPU 11 determines whether the received setting information is acceptable or not under the current situation of the device 10, namely, whether the setting in accordance with the received setting information can be made in the device 10 under the current situation (S407). The CPU 11 makes the determination at S407 in the same manner as in the above-described determination made at S402. Where the CPU 11 determines that the setting can be made in accordance with the received setting information (S407, Yes), the CPU 11 stores the received setting information in the NVRAM 14 (S408). Meanwhile, where the CPU 11 makes a negative determination at S407 (S407: No), the CPU 11 transmits an error notification to the management device (S409), and then the control flow goes back to S401.

FIG. 4B is a flow chart showing power-ON-state processing that is to be executed, by the CPU 11 of the device 10, in accordance with the control program 12a. This power-ON-state processing is initiated upon power ON of the device 10. The CPU 11 connects the device 10 with the relay server 100 through the connection-establishment type protocol (S421). The CPU 11 transmits the start-up notification to the relay server 100 (S422). The CPU 11 transmits the setting-information request to the relay server 100 (S423). The processing executed at S423 corresponds to the processing executed at T11 in the sequence diagrams of FIGS. 2A and 2B.

The CPU 11 waits for reception of the setting information from the relay server 100 (S424: No, S429: No). When the device 10 receives the setting information from the relay server 100 (S424: Yes), the CPU 11 determines whether or not the setting can be made in accordance with the received setting information under the current situation of the device 10 (S425). The CPU 11 makes the determination at S425 in the same manner as in the above-described determination made at S402.

Where the CPU 11 determines that the setting can be made in accordance with the received setting information (S425: Yes), the CPU 11 stores the received setting information in the RAM 13 (S426). The processing executed at S426 corresponds to the processing executed at T13 and T16 in the sequence diagrams of FIGS. 2A and 2B. The CPU 11 transmits the result information representing the setting success, together with the corresponding setting information and the device ID representing its own device, to the relay server 100 (S427), and then the control flow goes back to S424. The processing executed at S427 corresponds to the processing executed at T14 and T17 in the sequence diagrams of FIGS. 2A and 2B.

On the other hand, where the CPU 11 determines that the setting cannot be made in accordance with the received setting information (S425: No), the CPU 11 transmits the result information representing the setting failure, the corresponding setting information and the device ID representing its own device, to relay server 100, without storing the setting information in the RAM 13 (S428), and the control flow goes back to S424. The processing executed at S428 corresponds to the processing executed at T14 and T17 in the sequence diagrams of FIGS. 2A and 2B.

Where a given length of time (e.g. 1 minute) has elapsed since the device 10 has transmitted the setting-information request to the relay server 100, or since the device 10 has last received the setting information from the relay server 100 (S429: Yes), the CPU 11 regards that the relay server 100 has transmitted all the setting information to be transmitted, so that the showing power-ON-state processing ends. Then, the control flow goes back to the above-described setting-information reception processing.

In the present embodiment, the relay server 100 stores the setting information received from the service providing server 200, in the setting management table, such that the received setting information is associated with the device ID. Further, the relay server 100 associates the setting information corresponding to the result information that has not been received from the device 10, with the setting-unattempted-status information as the status information. Owing to this arrangement, the relay server 10 can transmit, to the device 10 that has been powered ON from OFF, the setting information which is associated with the device ID specifying the same device 10 and which is associated with the setting-unattempted-status information. Therefore, irrespective of situation of the device 10, the service providing server 200 can attempt to make setting in the device 10 in accordance with the setting information, thereby eliminating necessity of powering ON of the device 10 in advance only for the purpose of transmitting the setting information to the device 10.

Further, upon reception of the result information transmitted from the device 10, the relay server 100 updates the status information in the setting management table, and then calls backs to the service providing server 200 to transmit the updated status information. Thus, it is possible to inform the service providing server 200 of the fact that the setting in accordance with the setting information has been attempted in the device 10. Since the status information contains one of the success information and the failure information, it is possible to inform the service providing server 200 whether the setting in accordance with the setting information has been made in the device 10 successfully or not.

In the above-described embodiment, the operation execution system 1 is an example of an operation execution system, the relay server 100 is an example of a relay server, the device 10 is an example of a device, the service providing server 200 is a service providing server as an example of an external device, the Internet 800 is an example of the Internet, each of the RAM 13 and NVRAM 14 is an example of a device memory, the memory 102 is an example of a server memory, the router 30 is an example of a router, the network I/F 103 is an example of a communication portion, and the CPU 101 is an example of a control portion.

Further, in the above-described embodiment, The setting information is an example of setting information, the device ID is an example of device specifying information, the result information representing the setting success is an example of first result information or result information, the result information representing the setting failure is an example of second result information or result information, the setting-unattempted-status information is an example of setting-unattempted-status information or status information, the success information is an example of setting-attempted-status information, first setting-attempted-status information or status information, the failure information is an example of setting-attempted-status information, second setting-attempted-status information or status information, the various kinds of information representing the status information and transmitted by the relay server 100 is an example of notification information, the destination information is an example of destination identifying information, the information contained in the collective setting request and requesting the collective setting is an example of collective setting information, and the setting-status acquisition request is an example of request information.

Still further, in the above-described embodiment, the processing executed by the service providing server 200 at T1 is an example of first setting-information transmission processing, the processing executed by the CPU 101 at S302 and S311 is an example of setting-information reception processing, the processing executed by the CPU 101 at S304 is an example of first memory-control processing or fourth memory-control processing, the processing executed by the CPU 101 at S305 is an example of first determining processing, the processing executed by the CPU 101 at S306 is an example of second setting-content-information transmission processing, the processing executed by the CPU 101 at S318 and S306 is an example of third setting-content-information transmission processing, the processing executed by the CPU 11 at S403 is an example of setting storage processing, the processing executed by the CPU 101 at S404 and S405 is an example of result-information transmission processing, the processing executed by the CPU 101 at S308 and S321 is an example of result-information reception processing, the processing executed by the CPU 101 at S304, S309 and S322 is an example of second memory-control processing, the processing executed by the CPU 101 at S310, S314 and S325 is an example of third memory-control processing or external transmission processing, the processing executed by the CPU 11 at S402 and S425 is an example of second determining processing, and the processing executed at S306 at which the setting information transmitted from the relay server 100 to the subject device 10 that is ON-line is relayed by the router 30 and then is received by the device 10, is an example of server push.

In the operation execution system, the processing execution device, the control device for controlling the processing execution device, the processing execution method, the program for establishing the operation execution system and the recording medium storing such a program, which have been described in the embodiment, the relay server is configured, upon reception of the setting information transmitted from the service providing server, to store the received setting information in the server memory such that the stored setting information is associated with the device specifying information that has been received together with the setting information. Where it had been determined that the relay server is not communicable with the specified device, the setting information stored in the server memory and corresponding to the specified device is transmitted by the relay server to the specified device, in case of satisfaction of a condition that the relay server has become communicable with the specified device. Therefore, even if the setting information is transmitted by the service providing server no matter how is the status of the communication between the relay server and the device, it is possible to attempt to make setting in the device in accordance with the transmitted setting information.

Further, the relay server associates the setting information stored in the server memory and corresponding to the result information that has not yet been received from the device, with the status information in the form of the setting-unattempted-status information representing that the setting in accordance with the setting information has not yet been attempted in the device. Meanwhile, the relay server associates the setting information corresponding to the result information that has been received from the device, with the status information in the form of the setting-attempted-status information representing that the setting in accordance with the setting information has been attempted in the device. Then, the notification information containing the status information that is to be notified to the external device that is connected to the relay server to be communicable with the relay server, is stored, together with the device specifying information corresponding to the setting information that is associated with the status information to be notified to the external device, in the server memory, such that the notification information is transmittable to the external device. Thus, the notification information can be transmitted to the external device, so that the fact that the setting has been attempted in the device specified by the device specifying information can be informed to the external device.

In the above-described embodiment, when it had been determined that the relay server is not communicable with the specified device, to transmit the setting information to the specified device, in case of satisfaction of the condition that the relay server has become communicable with the specified device, wherein the transmitted setting information corresponds to the specified device with which the relay server has become communicable, and is associated with the setting-unattempted-status information. Thus, at a point of time at which the relay server becomes communicable with the device (with which the relay server has not been communicable), it is possible to attempt to make setting in the device in accordance with the setting information which had been transmitted from the service providing server and which is associated with the setting-unattempted-status information. Upon reception of the result information transmitted from the device, the relay server switches the status information from the setting-unattempted-status information to the setting-attempted-status information, in case of satisfaction of the condition that the setting information corresponding to the received result information is associated with the setting-unattempted-status information in the server memory. Upon reception of the result information corresponding to the setting information (that had been associated with the setting-unattempted-status information before transmission of the setting information to the device), the relay server stores the notification information containing the status information that has been updated based on the received result information, in the server memory, such that the stored notification information is transmittable to the external device That is, in case of satisfaction of a condition that the setting has been attempted in the device in accordance with the setting information (in accordance with which the setting had not been attempted in the device), the relay server provides the service providing server with the notification information notifying the fact that the setting has been attempted in the device in accordance with the setting information. Therefore, it is possible to prevent transmission of notification overlapping with another notification in contents, namely, transmission of notification relating to the setting information in accordance with which the setting had been already made in the device. Thus, the communication load can be alleviated.

In the above-described embodiment, the relay server transmits the notification information and the device specifying information stored in the server memory, to the external device, so that it is possible to inform the external device of the fact that the setting in accordance with the setting information has been attempted in the device specified by the device specifying information.

In the above-described embodiment, the relay server transmits the device specifying information and the notification information corresponding to the setting information, to the external device, wherein the transmission of the device specifying information and the notification information is made with reference to the destination information that had been received from the service providing server together with the setting information. Thus, it is possible to transmit the notification information, to the destination or address designated by the service providing server. Particularly, in case of satisfaction of the condition that the result information (corresponding to the setting information that had been associated with the setting-unattempted-status information when the setting information was transmitted to the device) has been received by the relay server, the relay server stores the notification information in the server memory such the stored notification information is transmittable to the external device. Owing to this arrangement, in case of satisfaction of the condition that the setting has been attempted in the device in accordance with the setting information (in accordance with which the setting had not yet been attempted in the device), the relay server can transmits the notification information notifying that fact, to the destination or address designated by the service providing server. Therefore, it is possible to prevent transmission of notification overlapping with another notification in contents, namely, transmission of notification relating to the setting information in accordance with which the setting had been already made in the device. Thus, the communication load can be alleviated.

In the above-described embodiment, where the relay server had received the collective setting information from the service providing server, the relay server transmits the notification information notifying that the setting in accordance with the setting information has been attempted in all of the devices subjected to the collective setting, to the destination or address designated by the service providing server, in case of reception of the result information from all of the devices subjected to the collective setting within the given length of time. On the other hand, the relay server transmits the notification information notifying that the setting in accordance with the setting information was not attempted in at least one of the devices subjected to the collective setting, to the destination or address designated by the service providing server, in case of failure in reception of the result information from all of the devices subjected to the collective setting within the given length of time or in case of reception of the result information from only a part of the devices subjected to the collective setting within the given length of time. Thus, it is possible to inform the service providing server of the status of the setting in accordance with the collective setting information. Further, when transmitting the notification information notifying that the setting in accordance with the setting information was not attempted in at least one of the devices subjected to the collective setting, the relay server transmits, together with the notification information, the device specifying information corresponding to the setting information that corresponds to the received result information. Thus, it is possible to inform the service providing server of which one or ones of the devices subjected to the collective setting the setting was not attempted in.

In the above-described embodiment, in response to reception of the request information from the external device, the relay server transmits the notification information notifying the status information that is associated with the setting information designated by the result information, to the external device from which the request information has been transmitted. Thus, it is possible to transmit the notification information complying with the request from the external device.

In the above-described embodiment, the device transmits the first result information as the result information in case where the setting information received from the relay server has been stored in the device memory. On the other hand, in case where the setting information received from the relay server was not accepted without the received setting information being stored in the device memory, the device transmits the second result information as the result information. In case where the result information received from the device is the first result information, the relay server stores the first setting-attempted-status information as the setting-attempted-status information such that the first setting-attempted-status information is associated with the corresponding setting information. On the other hand, in case where the result information received from the device is the second result information, the relay server stores the second setting-attempted-status information as the setting-attempted-status information such that the second setting-attempted-status information is associated with the corresponding setting information. Thus, the status information specifying whether the setting information has been stored in the device or not, namely, whether the setting information has been accepted in the device or not, can be associated with the setting information.

In the above-described embodiment, the relay server transmits the setting information associated with the setting-unattempted-status information after having transmitted all the setting information associated with the setting-attempted-status information, upon satisfaction of the condition that the relay server has become communicable with the device (with which the relay server had not been communicable), in case where there are the setting information associated with the setting-attempted-status information and the setting information associated with the setting-unattempted-status information among the setting information which is associated with the device specifying information specifying the device having become communicable with the relay server and which is stored in the server memory. Thus, it is possible to avoid problem that the setting information associated with the setting-attempted-status information cannot be stored in the device memory and accordingly the setting in accordance with the setting information associated with the setting-attempted-status information cannot be made in the device because the setting in accordance with the setting information associated with the setting-unattempted-status information has been already made in the device.

In the above-described embodiment, the setting information corresponding to the device that has become communicable with the relay server is transmitted in such a manner that makes the attempted-setting information and the unattempted-setting setting information distinguishable from each other. The device executes the second determining processing such that a higher priority is given to the determination as to whether the received attempted-setting information is acceptable or not, than to the determination as to whether the received unattempted-setting information is acceptable or not. Thus, it is possible to avoid problem that the setting information associated with the setting-attempted-status information cannot be stored in the device memory and accordingly the setting in accordance with the setting information associated with the setting-attempted-status information cannot be made in the device because the setting in accordance with the setting information associated with the setting-unattempted-status information has been already made in the device.

In the above-described embodiment, in case where the setting information received from the service providing server is a menu item available from the service providing server, if the number of the menu items already set in the device has reached the upper limit stored in the device memory, the device determines that the received setting item cannot be accepted. Thus, it is possible to prevent problem that could happen in event of excess of the upper limit of number of the menu items.

In the above-described embodiment, in case where the received setting information is limitation information for providing a limitation on the screen displayed upon start-up of the device, if the limitation information has been already stored in the device memory prior to the reception of the limitation information, the device determines that the received setting information is not acceptable. Thus, it is possible to prevent problem that could happen in event of overlap of the limitation information.

In the above-described embodiment, the reference information used for the determination as to whether the setting information received from the relay server is acceptable or not, is the setting information that the device receives from the service providing server via the relay server. Therefore, it is possible to restrain problem that could happen if the setting information received from a service providing server conflicts with setting information previously received from another service providing server.

In the above-described embodiment, the reference information used for the determination as to whether the setting information received from the relay server is acceptable or not, is information that the device obtains from an external device without via the relay server. Therefore, it is possible to restrain problem that could happen if the setting information received from the service providing server conflicts with information obtained from the external device without via the relay server.

In the above-described embodiment, the reference information used for the determination as to whether the setting information received from the relay server is acceptable or not, is information which is dependent on the type of device and which is stored in the device memory when the device is manufactured. Therefore, it is possible to restrain problem that could happen by conflict between the setting information received from the service providing server and the information that is stored when the device is manufactured.

In the above-described embodiment, the relay server transmits the second result information as the notification information to the external device, only in case where the second result information as the result information corresponding to the setting information that had been associated with the setting-unattempted-status information upon transmission thereof to the device, is received from the device. Therefore, it is possible to inform the service providing server of the fact that the setting information was not stored in the device memory.

In the above-described embodiment, the device and the Internet are connected to each other via the router. The device and the relay server are connected to each other in such a manner that enables a server push by which information generated on the Internet and to be transmitted to the device is transmitted from the relay server to the device via the router with use of connection-establishment-type communication protocol so that the device receives the transmitted information. The relay server transmits information received from the service providing server, to the device in such a manner that enables the server push, with use of the communication protocol. Therefore, the relay server can transmit the setting information as needed by using the connection-establishment-type communication protocol, and can receive the result information corresponding to the transmitted setting information, from the device.

While the presently preferred embodiment of this invention has been described above in detail by reference to the accompanying drawings, it is to be easily assumed that the present invention may be embodied with various other changes, modifications and improvements, which may occur to those skilled in the art, without departing from the spirit and scope of the invention.

For example, in the above-described embodiment, the device 10 is constituted by the multi function peripheral, by way of example. However, the device 10 may be a device having a single function such as printer or scanner function as long as the device is capable of using the service provided by the service providing server 200. Further, the device 10 may be a sewing machine configured to embroider or quilt a desired image in accordance with instruction data, or a sewing machine configured to perform decorative stitch or other sewing work so as to produce a workpiece or product based on image data. Still further, the device 10 may be a 3D printer configured to produce a three-dimensional object by layering, spraying or cutting in accordance with instruction data, a machine tool configured to machine a material in accordance with instruction data, a device configured to play a musical piece or a device configured to play a screen image. Moreover, the device 10 may be a sensing device configured to periodically acquire some information, or an operation management device configured to manage a domestic equipment or a plant facility, for example.

In the above-described embodiment, there has been described the case where the device 10 is being powered OFF, as an example of case where the device 10 is OFF-line. However, as another example of case where the device 10 is OFF-line, there is case where the communication between the device 10 and the relay server 100 is being cut or disconnected. That is, the present invention is applicable also in the case where the communication is being disconnected. In such a case, the CPU 101 of the relay server 100 may execute the processing of S316 and other steps following S316, upon connection of the communication between the device 10 and the relay server 100.

In the above-described embodiment, in case where the device 10 has become ON-line from OFF-line, the CPU 101 of the relay server 100 implements S318 to transmit the setting information associated with the setting-attempted-status information, to the device 10. In this instance, the CPU 101 may transmit only the setting information associated with the success information, without transmitting the setting information associated with the failure information.

In the above-described embodiment, in case where the device 10 has become powered ON from OFF, in response to reception of the setting information transmitted from the relay server 100, the CPU 11 of the device 10 transmits the result information to the relay server 100, irrespective of whether the received setting information is associated with the setting-attempted-status information or setting-unattempted-status information (see S427 and S428). In this instance, the CPU 11 may transmit the result information to the relay server 100 only in case of satisfaction of a condition that the setting information received from the relay server 100 is associated with the setting-unattempted-status information. The CPU 101 of the relay server 100 transmits, to the device 10, the setting information with additional information (e.g. flag) added to the setting information, where the additional information that makes it possible to determine whether the transmitted setting information is associated with the setting-attempted-status information or setting-unattempted-status information, so that the device 10 can determine whether the setting information received from the relay server 100 is associated with the setting-attempted-status information or setting-unattempted-status information. It is also possible to employ an arrangement where the CPU 101 transmits all the setting information associated with the setting-attempted-status information and then transmits information representing that the transmitted setting information is associated with the setting-attempted-status information. In this arrangement, too, the device 10 can determine whether the setting information received from the relay server 100 is associated with the setting-attempted-status information or setting-unattempted-status information.

In the above-described embodiment, in case where the device 10 has become powered ON from OFF, the CPU 101 of the relay server 100 transmits, to the device 10, the setting information associated with the setting-attempted-status information earlier than the setting information associated with the setting-unattempted-status information. However, this arrangement may be replaced by a modified arrangement where the device 10 makes the setting in accordance with the received setting information associated with the setting-attempted-status information earlier than the setting in accordance with the received setting information associated with the setting-unattempted-status information. In this modified arrangement, the CPU 101 of the relay server 100 may transmit, to the device 10, the setting information with additional information (e.g. flag) added to the setting information, where the additional information that makes it possible to determine whether the transmitted setting information is associated with the setting-attempted-status information or setting-unattempted-status information. As in the above-described embodiment, in this modified arrangement, too, it is possible to avoid the problem that the setting information associated with the setting-attempted-status information cannot be stored in the RAM 13 and the setting in accordance with the setting information associated with the setting-attempted-status information cannot be made.

In the above-described embodiment, the CPU 101 of the relay server 100 associates the set of information with the setting-unattempted-status information at S304, after having received the setting information from the service providing server 200. However, the set of information does not have to be associated with the setting-unattempted-status information necessarily upon implementation of S304, but may be associated with the setting-unattempted-status information at another stage. For example, in case where the result information cannot be received from the device 10 even when a given length of time (e.g. 1 minute) has elapsed since the setting information had been received from the service providing server 200, the CPU 101 may associate the setting information with the setting-unattempted-status information.

In the above-described embodiment, in case where the relay server 100 receives the collective setting request from the service providing server 200, S321 and other steps following S321 are implemented upon satisfaction of a condition that the setting information has been transmitted to all of the devices 10 subjected to the collective setting. However, this arrangement may be replaced by a modified arrangement where, if the transmission of the setting information to all of the devices 10 subjected to the collective setting is not completed within a given length of time after the reception of the collective setting request, the CPU 101 calls back to the service providing server 200 to transmit information representing that fact.

In the above-described embodiment, in case where the setting is made in accordance with the setting request requesting the setting to be made in a single one device 10, the CPU 101 of the relay server 100 calls back to the service providing server 200 upon satisfaction of a condition that the status information is updated from the setting-unattempted-status information to the setting-attempted-status information at S309. However, this arrangement may be replaced by a modified arrangement where the CPU 101 of the relay server 100 calls back to the service providing server 200 upon satisfaction of two conditions consisting of a condition that the status information is updated from the setting-unattempted-status information to the setting-attempted-status information and another condition that the setting-attempted-status information is the failure information. In this arrangement, the fact that the setting was failed in the device 10 can be informed to the service providing server 200.

In the above-described embodiment, the relay server 100 calls back to the service providing server 200, upon reception of the result information from the device 10. However, the relay server 100 may be configured to not transmit information to an external device such as the service providing server 200. That is, the relay server 100 may be a device that exclusively receives information.

In the above-described embodiment, upon reception of the setting-status acquisition request transmitted from the service providing server 200, the CPU 101 of the relay server 100 implements S314, namely, executes the processing for transmitting the setting information and the status information. However, the CPU 101 may implement S314 also in case of reception of the similar request from an external device other than the service providing server 200.

In the above-described embodiment, each of the setting request and the collective setting request does not contain service specifying information specifying the service providing server 200. However, each of these requests may contain the service specifying information.

In the above-described embodiment, the status information is contained in the information which is transmitted from the relay server 100 to the service providing server 200 and which represents completion of the setting. However, this arrangement may be replaced by a modified arrangement where the relay server 100 transmits information which represents completion of the setting and which does not contain the status information.

In the above-described embodiment, at S325, when the information representing that the collective setting is not completed is called back to the service providing server 200, the relay server 100 transmits, together with such information, the device ID of the device 10 associated with the setting-attempted-status information and the device ID of the device 10 associated with the setting-unattempted-status information, to the service providing server 200. However, this arrangement may be replaced by a modified arrangement where the relay server 100 does not transmit any device ID to the service providing server 200.

In the above-described embodiment, in case where it is determined at S305 that the subject device 10 is OFF-line, the CPU 101 of the relay server 101 implements S316 and other steps following S316 upon reception of the start-up notification. During the setting is being made in a single device 10 in accordance with the setting request, the CPU 101 may go back to S302 if the start-up notification is not received within a given length of time (e.g., 30 minutes).

In the above-described embodiment, after having transmitted the setting information to all of the devices 10 subjected to the collective setting, the CPU 101 of the relay server 100 waits for reception of the result information from these devices 10, for a given length of period (e.g., one day) in the relay processing. However, this arrangement may be replaced by a modified arrangement where, after having transmitted the setting information to all of the devices 10 subjected to the collective setting, the CPU 101 of the relay server 100 waits for reception of the result information from these devices 10 in background rather than in the relay processing. In this modified arrangement, after a positive determination (Yes) is obtained at S320, the CPU 110 goes back to S302. Thereafter, upon reception of the result information from all of the devices 20 subjected to the collective setting, the CPU 101 implements S310.

A part of processings shown in FIGS. 3, 4A and 4B may be omitted or modified within a range that does not depart from the scope defined in independent claims. For example, implementation of S302, S303, S307, S320-S325 shown in FIG. 3 may be skipped. Further, implementation of S313 and S314 may be skipped.

In the above-described embodiment, the CPU 101 or the CPU 11 executes the processings shown in FIGS. 3, 4A and 4B. However, the processings may be executed by cooperation of a plurality of CPUs. Further, the processings may be executed by either an individual IC such as ASIC or cooperation of a plurality of ICs such as ASICs. Still further, the processings may be executed by cooperation of the CPU 11 and IC such as ASIC.

What is claimed is:

1. An operation execution system comprising:
a device including a device memory and configured to execute a particular operation;
a service providing server provided on the Internet and configured to provide service that causes said device to execute the particular operation; and
a relay server including a server memory and provided on the Internet, said relay server being configured to relay between said service providing server and said device,
wherein said relay server is connectable with said device to communicate such that particular information transmitted from said relay server is receivable by said device,
wherein said relay server and said service providing server are connected to be communicable with each other,
wherein particular information transmitted from said service providing server is unreceivable by said device without via said relay server, the particular information being not requested by said device,
wherein said service providing server is configured to execute:
a first setting-information transmission processing for transmitting setting information and device specifying information to said relay server, such that the setting information is transmitted to make setting in said device and the device specifying information is transmitted to specify said device to which the setting information is to be directed,
wherein said relay server is configured to execute:
a setting-information reception processing for receiving the setting information and the device specifying information that have been transmitted from said service providing server in the first setting-information transmission processing;
a first memory-control processing for storing, in said server memory, the setting information associated with the device specifying information that has been received together with the setting information in the setting-information reception processing;
a first determining processing for determining whether said relay server is communicable with said device specified by the device specifying information;
a second setting-information transmission processing for transmitting the setting information to said specified device, when it is determined in the first determining processing that said relay server is communicable with said specified device; and
a third setting-information transmission processing for transmitting the setting information stored in said server memory, to said specified device, when it is determined in the first determining process that said relay server has become communicable with communicable with said specified device after once determined in the first determining process that said relay server is not communicable with said specified device,
wherein said device is configured to execute:
a setting storage processing for storing the received setting information in said device memory, upon reception of the setting information transmitted in one of the second setting-information transmission processing and the third setting-information transmission processing; and
a result-information transmission processing for transmitting result information representing that the setting storage processing has been executed, to said relay server, upon execution of the setting storage processing,
wherein said relay server is configured to execute:
a result-information reception processing for receiving the result information transmitted from said device in the result-information transmission processing;
a second memory-control processing for associating the setting information stored in said server memory, with status information representing a status of the setting in said device,
in the second memory-control processing;
the setting information is associated with setting-unattempted-status information when the result information has not been received in the result-information reception processing, the setting-unattempted-status information being one form of the status information; and
the setting information is associated with setting-attempted-status information when the result information has been already received in the result-information reception processing, the setting-attempted-status information being another form of the status information, and a third memory-control processing for storing, in said server memory, notification information containing the status information that is to be notified to an external device that is connected to said relay server, together with the device specifying information corresponding to the setting information that is associated with the status information to be notified to the external device, such that the notification information is transmittable to the external device.

2. The operation execution system according to claim 1, wherein the third setting-information transmission processing is executed to transmit the setting information to said specified device, when it is determined in the first determining process that said relay server has become communicable with communicable with said specified device, the setting information transmitted in the third setting-information transmission processing corresponding to said specified device with which said relay server has become communicable, and being associated with the setting-unattempted-status information.

3. The operation execution system according to claim 1,
wherein the second memory-control processing is executed, upon reception of the result information in the result-information reception processing, to switch the status information from the setting-unattempted-status information to the setting-attempted-status information, when the setting information corresponding to the received result information has been associated with the setting-unattempted-status information in said server memory, wherein, after the setting information associated with the setting-unattempted-status information has been transmitted to said device in one of the second setting-information transmission processing and the third setting-information transmission processing, the third memory-control processing is executed, upon reception of the result information which corresponds to the setting information transmitted to said device and which has been transmitted from said device, to store the notification information containing the status information which is based on the received result information and which has been stored in said server memory, in said server memory, such that the notification information is stored together with the device specifying information corresponding to the setting information that corresponds to the result information transmitted from said device, and such that the stored notification information is transmittable to the external device, and wherein, after the setting information associated with the setting-unattempted-status information has been transmitted to said device in one of the second setting-information transmission processing and the third setting-information transmission processing, the third memory-control processing is executed, even upon reception of the result information which corresponds to the setting information transmitted to said device and which has been transmitted from said device, to not store the notification information containing the status information which is based on the received result information and which has been stored in said server memory, in said server memory.

4. The operation execution system according to claim 1, wherein said relay server is configured to execute an external transmission processing for transmitting the device specifying information and the notification information that have been stored in said server memory, to the external device.

5. The operation execution system according to claim 4,
wherein the first setting-information transmission processing is executed to transmit, together with the setting information and the device specifying information, destination information representing a destination to which the notification information is to be transmitted, wherein the setting-information reception processing is executed to receive the destination information together with the setting information and the device specifying information, from said service providing server, wherein said relay server is configured, upon reception of the destination information together with the setting information and the device specifying information in the setting-information reception processing, to execute a fourth memory-control processing for storing the received setting information and destination information, such that the stored setting information and destination information are associated with each other, wherein the third memory-control processing is executed, upon reception of the result information in the result-information reception processing, to store, in said server memory, the notification information for notifying the status information associated with the setting information that corresponds to the received result information, together with the device specifying information corresponding to the setting information that corresponds to the received result information, such that the stored notification information is transmittable to the external device, and wherein the external transmission processing is executed to transmit the device specifying information and the notification information that have been stored in said server memory in the third memory-control processing, with reference to the destination information that has been stored in said server memory in the fourth memory-control processing.

6. The operation execution system according to claim 5,
wherein, in case of satisfaction of two conditions including:
(i) a condition that the result information received in the result-information reception processing is based on the setting information that has been transmitted to said device in the third setting-information transmission processing; and
(ii) another condition that the setting information corresponding to the result information received in the result-information reception processing has been associated with the setting-unattempted-status information in said server memory upon transmission of the setting information in the third setting-information transmission processing, the third memory-control processing is executed to store the notification information together with the device specifying information corresponding to the setting information that corresponds to the result information that has been received in the result-information reception processing, in said server memory, such that the stored notification information is transmittable to the external device.

7. The operation execution system according to claim 5,
wherein the first setting-information transmission processing is executed to transmit, together with the setting information and the device specifying information, the destination information and collective setting information that requests the setting to be made in every one of a plurality of devices, wherein the setting-information reception processing is executed to receive the destination information and the collective setting information together with the setting information and the device specifying information, from said service providing server, wherein the third memory-control processing is executed, upon reception of the result information from every one of said plurality of devices within a given length of time, to store, in said server memory, the notification information for notifying that the setting has been attempted in every one of the plurality of devices, together with the device specifying information corresponding to the setting information that corresponds to the received result information, such that the stored notification information is transmittable to the external device, wherein the third memory-control processing is executed, in case of failure in reception of the result information from at least one of said plurality of devices within the given length of time, to store, in said server memory, the notification information for notifying that the setting has not been attempted in said at least one of said plurality of devices, together with the device specifying information corresponding to the setting information that corresponds to the unreceived result information, such that the stored notification information is transmittable to the external device, and wherein the external transmission processing is configured to transmit the device specifying information and the notification information that have been stored in said server memory in the third memory-control processing, with reference to the destination information that has been stored in said server memory in the fourth memory-control processing.

8. The operation execution system according to claim 4, wherein the external transmission processing is executed, upon reception of request information from the external device, to transmit the notification information for notifying the status information associated with the setting information that is designated by the received request information, to the external device from which the request information has been transmitted.

9. The operation execution system according to claim 1, wherein the result information is one of (i) first result information representing that the setting information has been stored in said device memory and (ii) second result information representing that the setting information was not stored in said device memory, wherein the setting-attempted-status information is one of (iii) first setting-attempted-status information representing that the setting information has been stored in said device memory and the setting has been completed and (iv) second setting-attempted-status information representing that the setting information was not stored in said device memory and the setting was failed, wherein said device is configured, upon reception of the setting information transmitted from said relay server in one of the second setting-information transmission processing and the third setting-information transmission processing, to execute a second determining processing for determining whether the received setting information is acceptable or not, based on reference information stored in said device memory, wherein the setting storage processing is executed to store the received setting information in said device memory, in case of satisfaction of a condition that it has been determined in the second determining processing that the received setting information is acceptable, wherein the result-information transmission processing is executed to transmit the first result information as the result information to said relay server when the setting storage processing has been executed in the setting storage processing, and is executed to transmit the second result information as the result information to said relay server when it has been determined in the second determining processing that the received setting information is not acceptable, wherein the second memory-control processing is executed to associate the setting information corresponding to the result information that has not been received in the result-information reception processing, with the setting-unattempted-status information as the status information, and wherein the second memory-control processing is executed to associate the setting information corresponding to the first result information as the result information that has been received in the result-information reception processing, with the first setting-attempted-status information as the status information, and to associate the setting information corresponding to the second result information as the result information that has been received in the result-information reception processing, with the second setting-attempted-status information as the status information.

10. The operation execution system according to claim 1, wherein the third setting-information transmission processing is executed, in the case of satisfaction of the condition that said relay server has become communicable with said specified device, when it had been determined in the first determining processing that said relay server is not communicable with said specified device, to transmit attempted-setting information, and then transmit unattempted-setting information after transmission of the first setting information, the attempted-setting information and unattempted-setting information being the setting information which have been associated with the device specifying information specifying said device becoming communicable with said relay server and which have been stored in said server memory, and the attempted-setting information being the setting information associated with the setting-attempted-status information, the unattempted-setting information being the setting information associated with the setting-unattempted-status information.

11. The operation execution system according to claim 9, wherein the third setting-information transmission processing is executed, in the case of the satisfaction of the condition that said relay server has become communicable with said specified device, when it had been determined in the first determining processing that said relay server is not communicable with the specified device, to transmit attempted-setting information and unattempted-setting information, in such a manner that makes the attempted-setting information and unattempted-setting information distinguishable from each other, the attempted-setting information and unattempted-setting information being the setting information which have been associated with the device specifying information specifying said device becoming communicable with said relay server and which have been stored in said server memory, and the attempted-setting information being the setting information associated with the setting-attempted-status information, the unattempted-setting information being the setting information associated with the setting-unattempted-status information, and wherein the second determining processing is executed such that a higher priority is given to the determination as to whether the received attempted-setting information is acceptable or not, than to the determination as to whether the received unattempted-setting information is acceptable or not.

12. The operation execution system according to claim 9, wherein, in case that the setting information received from said service providing server in the setting-information reception processing is information for setting, in said device, a menu item available from said service providing server, the reference information represents an upper limit of number of menu items that can be set in said device, the upper limit being stored in said device memory, and wherein, in the case that the setting information received from said service providing server in the setting-information reception processing is information for setting the menu item in said device, the second determining processing is executed to determine that the received setting information is not acceptable when a number of the menu items already set in said device has reached the upper limit, and to determine that the received setting information is acceptable when the number of the menu items already set in said device has not yet reached the upper limit.

13. The operation execution system according to claim 9, wherein, in case that the setting information received from said service providing server in the setting-information reception processing is limitation information for providing a limitation on a screen displayed upon start-up of said device, the reference information is the limitation information that is to be stored in said device memory prior to reception of the limitation information, and wherein, in the case that the setting information received from said service providing server in the setting-information reception processing is the limitation information for providing the limitation on the screen displayed upon start-up of said device, the second determining processing is executed to determine that the received setting information is not acceptable when the limitation information has been already stored in said device memory prior to the reception of the limitation information, and to determine that the received setting information is acceptable when the limitation information has not yet stored in said device memory prior to the reception of the limitation information.

14. The operation execution system according to claim 9, wherein the reference information to be stored in said device memory is the setting information that said device has received from said service providing server via said relay server.

15. The operation execution system according to claim 9, wherein the reference information to be stored in said device memory is the setting information which can be received from said service providing server via said relay server and which can be received from an external device that is connected to said device to be communicable with said device without via said relay server, and wherein the reference information stored in said device memory is information that said device has obtained from the external device without via said relay server.

16. The operation execution system according to claim 9, wherein the reference information to be stored in said device memory is the setting information which can be received from said service providing server via said relay server and which can be received from an external device that is connected to said device to be communicable with said device without via said relay server, and wherein the reference information stored in said device memory is information which is dependent on a type of said device and which has been stored in said device memory when said device was manufactured.

17. The operation execution system according to claim 9, wherein the first setting-information transmission processing is executed to transmit, together with the setting information and the device specifying information, destination information representing a destination to which the notification information is to be transmitted, wherein the setting-information reception processing is executed to receive the destination information together with the setting information and the device specifying information, from said service providing server, wherein, in case of satisfaction of three conditions including (i) a condition that the result information received in the result-information reception processing is based on the setting information that has been transmitted to said device in the third setting-information transmission processing, (ii) another condition that the setting information corresponding to the result information received in the result-information reception processing has been associated with the setting-unattempted-status information in said server memory upon transmission of the setting information in the third setting-information transmission processing, and (iii) still another condition that the result information received in the result-information reception processing is the second result information, the third memory-control processing is executed to store the second result information as the notification information together with the device specifying information corresponding to the setting information that corresponds to the result information that has been received in the result-information reception processing, in said server memory, such that the stored second result information is transmittable to the external device, wherein said relay server is configured, upon reception of the destination information together with the setting information and the device specifying information in the setting-information reception processing, to execute a fourth memory-control processing for storing the received setting information and destination information in said server memory such that the stored setting information and destination information are associated with each other, and wherein said relay server is configured to execute an external transmission processing for transmitting the second result information and the device specifying information that have been stored in said server memory, with reference to the destination information that has been stored in said server memory.

18. The operation execution system according to claim 1, wherein said device and the Internet are connected to each other via a router, wherein said device and said relay server are connected to each other in such a manner that enables a server push by which information generated on the Internet and to be transmitted to said device is transmitted from said relay server to said device via said router with use of connection-establishment-type communication protocol so that said device receives the transmitted information, and wherein said relay server is configured to transmit information received from said service providing server, to said device in such a manner that enables the server push, with use of the communication protocol.

19. A relay server comprising:

a communication portion;

a server memory; and a control portion, wherein said communication portion is connected to a device to be communicable with the device, and is connected to a service providing server that are configured to provide service that causes the device to execute processing, wherein said control portion is configured to execute:

a setting-information reception processing for receiving setting information and device specifying information that have been transmitted from said service providing server such that the setting information is received to make setting in the device and the device specifying information is received to specify the device to which the setting information is to be directed, a first memory-control processing for storing, in said server memory, the setting information associated with the device specifying information that has been received together with the setting information in the setting-information reception processing;

a first determining processing for determining whether said relay server is communicable with said device specified by the device specifying information;

a second setting-information transmission processing for transmitting the setting information to said specified device, when it is determined in the first determining processing that said relay server is communicable with said specified device;

a third setting-information transmission processing for transmitting the setting information stored in said server memory, to said specified device, when it is determined in the first determining process that said relay server has become communicable with communicable with said specified device after once determined in the first determining process that said relay server is not communicable with said specified device, a result-information reception processing for receiving, from the device that has received the setting information transmitted in one of the second setting-information transmission processing and the third setting-information transmission processing, result information representing that the device has executed a setting storage processing for storing the received setting information in a device memory included in the device, a second memory-control processing for associating the setting information stored in said server memory, with status information representing a status of the setting in the device, in the second memory-control processing;

the setting information is associated with setting-unattempted-status information when the result information has not been received in the result-information reception processing, the setting-unattempted-status information being one form of the status information; and the setting information is associated with setting-attempted-status information when the result information has been already received in the result-information reception processing, the setting-attempted-status information being another form of the status information, and a third memory-control processing for storing, in said server memory, notification information containing the status information that is to be notified to an external device that is connected to said relay server, together with the device specifying information corresponding to the setting information that is associated with the status information to be notified to the external device, such that the notification information is transmittable to the external device.

* * * * *